(12) United States Patent
Cheng et al.

(10) Patent No.: US 12,019,326 B2
(45) Date of Patent: Jun. 25, 2024

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventors: Wei Cheng, Hubei (CN); Wenlong Ye, Hubei (CN); Rui He, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 269 days.

(21) Appl. No.: 17/623,904

(22) PCT Filed: Dec. 15, 2021

(86) PCT No.: PCT/CN2021/138357
§ 371 (c)(1),
(2) Date: Dec. 30, 2021

(87) PCT Pub. No.: WO2023/102975
PCT Pub. Date: Jun. 15, 2023

(65) Prior Publication Data
US 2023/0176414 A1 Jun. 8, 2023

(30) Foreign Application Priority Data
Dec. 8, 2021 (CN) .......................... 202111493287.2

(51) Int. Cl.
*G02F 1/13* (2006.01)
*G02F 1/1335* (2006.01)
*G02F 1/1343* (2006.01)

(52) U.S. Cl.
CPC .. *G02F 1/133512* (2013.01); *G02F 1/133526* (2013.01); *G02F 1/133531* (2021.01); *G02F 1/134309* (2013.01)

(58) Field of Classification Search
None
See application file for complete search history.

(56) References Cited

U.S. PATENT DOCUMENTS

2008/0259233 A1* 10/2008 Krijn ...................... H04N 13/32
348/51
2013/0314649 A1 11/2013 Choi
(Continued)

FOREIGN PATENT DOCUMENTS

CN 101341763 A 1/2009
CN 102681164 A 9/2012
(Continued)

OTHER PUBLICATIONS

International Search Report in International application No. PCT/CN2021/138357, dated Aug. 29, 2022.
(Continued)

*Primary Examiner* — Thanh Nhan P Nguyen
(74) *Attorney, Agent, or Firm* — Rivka Friedman

(57) ABSTRACT

Embodiments of the present application provides a display panel and a display device, the display panel includes a display panel body; a first dimming layer is disposed on one side of the display panel body, the first dimming layer includes a plurality of light shielding members and a plurality of light receiving members, the plurality of light shielding members are disposed at intervals, each light receiving member is disposed between two adjacent light shielding members; wherein the plurality of light receiving members is a lens structure in a first mode. A display effect
(Continued)

of the display panel at a specific viewing angle is improved, and the display panel has an anti-peep function.

18 Claims, 5 Drawing Sheets

(56) References Cited

U.S. PATENT DOCUMENTS

2018/0259799 A1\* 9/2018 Kroon .................. G02F 1/1323
2019/0179074 A1\* 6/2019 Choi ...................... G02B 6/005

FOREIGN PATENT DOCUMENTS

| CN | 103827726 A | 5/2014 |
| CN | 108027528 A | 5/2018 |
| CN | 110632804 A | 12/2019 |
| CN | 110888270 A | 3/2020 |
| CN | 111487804 A | 8/2020 |
| CN | 111965864 A | 11/2020 |
| CN | 112540474 A | 3/2021 |
| CN | 113552741 A | 10/2021 |

OTHER PUBLICATIONS

Written Opinion of the International Search Authority in International application No. PCT/CN2021/138357, dated Aug. 29, 2022.
Chinese Office Action issued in corresponding Chinese Patent Application No. 202111493287.2 dated Jan. 4, 2023, pp. 1-10.

\* cited by examiner

DISPLAY PANEL AND DISPLAY DEVICE

BACKGROUND OF DISCLOSURE

Field of Disclosure

The present disclosure belongs to a field of display technology, and particularly relates to a display panel and a display device.

Description of Prior Art

In a rapidly developing information age, people begin to pay more and more attention to protection of personal information. With development of display technology, a type of display device having an anti-peep function has emerged. Such a display device can only allow a user at a front viewing angle to view a screen displayed by the display device, while a bystander at a side viewing angle cannot view the screen, thereby achieving an effect of protecting user privacy.

At present, a grating structure may be formed on a light-emitting side of the display device, and a viewing angle range of the display device may be reduced by the grating structure, so as to implement the anti-peep function.

SUMMARY OF DISCLOSURE

Embodiments of the present disclosure provides a display panel and a display device, by setting a first dimming layer, a display effect of the display panel in a special viewing angle is improved, and the display panel has an anti-peep function.

In a first aspect, embodiments of the present disclosure provides a display panel, comprising:
- a display panel body; and
- a first dimming layer disposed on one side of the display panel body, wherein the first dimming layer comprises a plurality of light shielding members and a plurality of light receiving members, the plurality of light shielding members are disposed at intervals, each of the light receiving members is disposed between two adjacent light shielding members;
- wherein the plurality of light receiving members is a lens structure in a first mode.

In a second aspect, embodiments of the present disclosure provides a display device, comprising:
- a display panel comprising any one of the above display panels;
- a backlight module disposed on a side of the display panel and configured to emit light to the display panel.

The display panel provided by the present disclosure comprises: the display panel body and the first dimming layer disposed on one side of the display panel body, the first dimming layer comprises a plurality of light shielding members and a plurality of light receiving members, the plurality of light shielding members are disposed at intervals, each light receiving member is disposed between two adjacent light shielding members; wherein the plurality of light receiving members is the lens structure in the first mode. A display effect of the display panel at a specific viewing angle is improved, and the display panel has an anti-peep function.

DESCRIPTION OF DRAWINGS

With reference to the accompanying drawings, technical solutions of the present disclosure and beneficial effects thereof will be apparent from the detailed description of the specific embodiments of the present disclosure.

DETAILED DESCRIPTION OF EMBODIMENTS

The following describes technical solutions of embodiments of the present disclosure clearly and completely with reference to the accompanying drawings in the embodiments of the present disclosure. It will be apparent that the described embodiments are only some but not all of the embodiments of the present disclosure. Based on the embodiments of the present disclosure, all other embodiments obtained by those skilled in the art without creative effort fall within the scope of the present disclosure.

Figure 1:
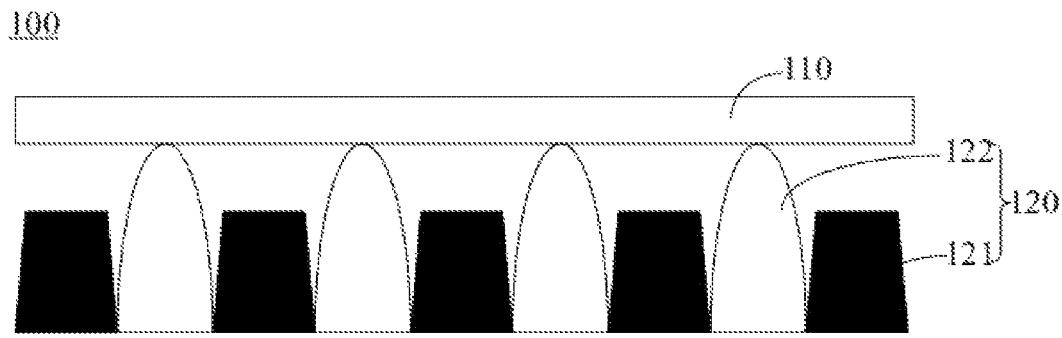
FIG. 1 is a first schematic structural diagram of a display panel according to an embodiment of the present disclosure.

An embodiment of the present disclosure provides a display panel. Referring to FIG. 1, FIG. 1 is a first schematic structural diagram of a display panel according to the present disclosure. A display panel 100 is applied to a display device, which may be a liquid crystal display or the like. The display panel 100 may comprise a display panel body 110 and a first dimming layer 120.

The first dimming layer 120 is disposed on a side of the display panel main body 110. The first dimming layer 120 may comprise a plurality of light shielding members 121 and a plurality of light receiving members 122. The plurality of light shielding members 121 are disposed at intervals, and each side close to an edge of the display panel body 110 is provided with one light shielding member 121. The plurality of light shielding members 121 may orient light passing between two adjacent light shielding members 121. For example, a material of the plurality of light shielding members 121 may be a black matrix or a ferrous metal material, so that when the light contacts the plurality of light shielding members 121, it will not pass through the plurality of light shielding members 121, but will propagate along a surface of the plurality of light shielding members 121. Alternatively, the material of the plurality of light shielding members 121 is an electrochromic material, and when the plurality of light shielding members 121 are energized to turn them into a color with light shielding effect, a light orientation function is achieved.

A cross section of each of the plurality of light shielding members 121 may be a trapezoidal structure. The trapezoidal structure comprises a long side, a short side, and two equal waists. One side of the short side may be disposed close a light incident side of the display panel body 110. A side of the long side can be arranged on a side of the short side away from the light incident side of the display panel body 110, so that light first passes through the long sides of the plurality of light shielding members 121, then passes through the short sides of the plurality of light shielding members 121, and finally enters the light incident side of the display panel body 110, Thus, by setting a specific shape, the plurality of light shielding members 121 can orient the light passing between two adjacent light shielding members. In addition, the cross-section of each of the plurality of light shielding members 121 is provided in a trapezoidal structure, so that light passing between two adjacent light shielding members can be diverged, so that light emission angle of light entering the display panel main body 110 is increased, so that the display panel body 110 has a larger range of light supporting display function thereof, and a display effect of the display panel 100 is improved.

The plurality of light receiving members 122 may also be disposed at intervals, and each light receiving member 122 may be disposed between two adjacent light shielding members 121. Further, the plurality of light receiving members 122 have a lens structure in a first mode, so that the plurality of light receiving members 122 have a light receiving effect on light passing through the plurality of light receiving members 122. The plurality of light receiving members 122 are a non-lens structure in a second mode, and since the plurality of light receiving members 122 do not have a lens structure, it is explained that the plurality of light receiving members 122 do not have a light receiving effect, and light passing through the plurality of light receiving members 122 propagates along the surface of the plurality of light shielding members 121, the viewing angle of the display panel 100 in the first mode is less than the viewing angle of the display panel 100 in the second mode. Wherein the plurality of light receiving members 122 comprise a light incident side and a light-emitting side, and if the plurality of light receiving members 122 are in the first mode, the lens structure protrudes toward the light-emitting side to achieve a light receiving effect thereof.

It should be noted that the first mode of the display panel 100 may be a anti-peep display mode, and the second mode of the display panel 100 may be a conventional display mode. In the first mode, the plurality of light receiving members 122 is configured that light passing through the plurality of light receiving members 122 is incident on the display panel main body 110 under the light receiving action of the lens structure, so that the light incident on the display panel main body 100 have a small light emitting angle, forming a specific viewing angle such as a front viewing angle, the display effect under the specific viewing angle can be improved according to the light receiving action, and at the same time, the other viewing angles are prevented from being peeped. In the second mode, the plurality of light receiving members 122 have a non-lens structure, and the light passing through the plurality of light receiving members 122 normally propagates. By means of the trapezoidal structure of the plurality of light shielding members 121, the light emitting angle of the light incident on the display panel main body 110 can be increased, the display viewing angle range of the conventional display mode can be increased, and the display effect can be improved.

In this embodiment, by providing the first dimming layer 120 in the display panel 100, since the plurality of light receiving members 122 in the first dimming layer 120 become the lens structure in the first mode to function as a light receiving member, and become the non-lens structure in the second mode which does not affect light passing through the plurality of light receiving members 122, so that the display panel 100 switches between an anti-peep display and a conventional display, the display panel 100 has the anti-peep function, and applicability of the display panel is improved.

In addition, the first dimming layer 120 may be a fixed structure, that is, the plurality of light receiving members 122 may have only a lens structure in the first mode, and may be made of a polymer material or a photoresist material to form a lens structure, so that light passing through the first dimming layer 120 can form a specific viewing angle such as a front viewing angle through the lens structure, and the display effect in the specific viewing angle can be improved according to the light receiving action, and at the same time, the other viewing angles can be prevented from being peeped.

When the plurality of light receiving members 122 have a fixed lens structure, the material of the plurality of light shielding members 121 may be a black photoresist or a ferrous metal material.

Figure 2:
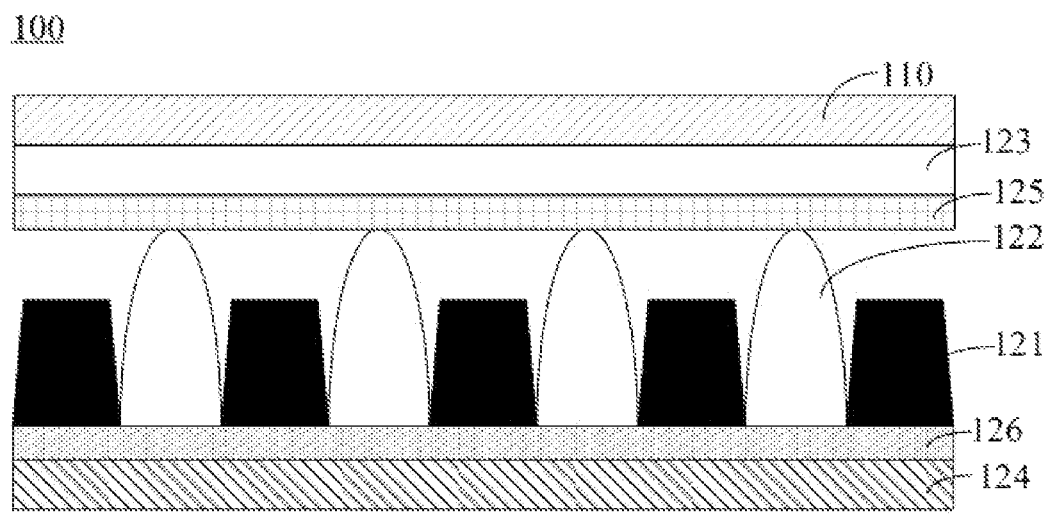
FIG. 2 is a second schematic structural diagram of a display panel according to an embodiment of the present disclosure.

Specifically, referring to FIG. 2, FIG. 2 is a second schematic structural diagram of a display panel according to an embodiment of the present disclosure. The first dimming layer 120 may further comprise a first substrate 123 and a second substrate 124 disposed on both sides of the plurality of light receiving members 122, specifically, the first substrate 123 is disposed between the display panel main body 110 and the plurality of light receiving members 122, the second substrate 124 is disposed on one side of the plurality of light receiving members 122 away from the display panel main body 110, and the first substrate 123 and the second substrate 124 protect the plurality of light shielding members 121 and the plurality of light receiving members 122 disposed between the first substrate 123 and the second substrate 124.

Further, a first electrode layer 125 is disposed between the first substrate 123 and the plurality of light receiving members 122, and a second electrode layer 126 is disposed between the second substrate 124 and the plurality of light receiving members 122. The first electrode layer 125 and the second electrode layer 126 are configured to load a voltage to control the plurality of light receiving members 122 to switch between the first mode and the second mode, even if the plurality of light receiving members 122 switch between the lens structure and the non-lens structure. The material of the first electrode layer 125 and the second electrode layer 126 may be a transparent indium tin oxide material or a transparent metal material, so that the light is not shielded.

Specifically, the plurality of light receiving members 122 may be a liquid crystal material that forms a structure including liquid crystal molecules. When a voltage difference between the first electrode layer 125 and the second electrode layer 126 is greater than a preset voltage threshold, an arrangement direction of the liquid crystal molecules is deflected to form a liquid crystal lens structure, that is, when a voltage is applied between the first electrode layer 125 and the second electrode layer 126, the plurality of light receiving members 122 form a liquid crystal lens structure. When the voltage difference between the first electrode layer 125 and the second electrode layer 126 is less than the preset voltage threshold, the arrangement direction of the liquid crystal molecules is not deflected, so that the liquid crystal molecules remain in a normal structure, that is, when no voltage is applied between the first electrode layer 125 and the second electrode layer 126, the plurality of light receiving members 122 are non-lens structure. The preset voltage threshold may be set according to actual requirements, and is not specifically limited herein.

Correspondingly, the plurality of light shielding members 121 may be provided as an electrochromic material when the plurality of light receiving members 122 may be switched between the first mode and the second mode by applying a voltage to the electrode layers on both sides thereof, and may be a first color when the plurality of light receiving members 122 are in a lens structure in the first mode, the first color may be a color having a light shielding effect, such as black, dark gray, or the like. When the plurality of light receiving members 122 are in a non-lens structure in the second mode, the plurality of light receiving members 122 may be a second color, which may be a color having a light transmitting effect, such as white, or the like.

It should be noted that height and the width of each light shielding member 121 are the same, and height and the width of each light receiving member 122 are the same, so that a light intensity passing through the plurality of light shielding members 121 and the plurality of light receiving members 122 is the same, so that the light is more uniform. And the height of each light receiving member 122 is greater than the height of each light shielding member 121, in particular, the height of each light receiving member 122 is 10-15 um, and the height of each light shielding member 121 is 5-7 um, so that when the plurality of light receiving members 122 are in the second mode, light passing through the plurality of light receiving members 122 has a diverging effect when passing through upper side edges of the plurality of light shielding members 121, so that the viewing angle range of the light is wider. In addition, each light shielding member 121 may be formed by splicing a plurality of layered structures. If the plurality of light shielding members 121 are electrochromic materials, a transmittance of the light shielding member 121 may be correspondingly improved by adopting a layered structure when the electrochromic color thereof is a transparent color such as white, and when the electrochromic color thereof is a light shielding color such as black, the light shielding effect may be equivalent to the light shielding effect of the light shielding member 121 through a black photoresist or a black metal material process. Further, since a cross section of the plurality of light shielding members 121 is a trapezoidal structure, inclination angles of the two waists can be set according to actual light shielding angles to satisfy different light shielding effects.

Figure 3:
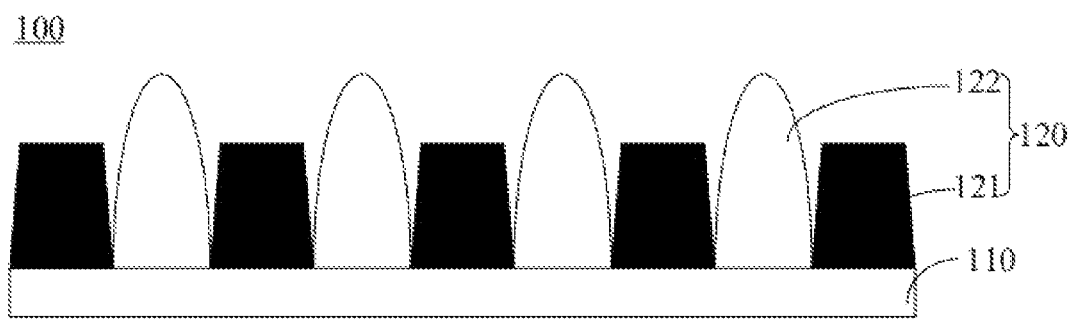
FIG. 3 is a third schematic structural diagram of a display panel according to an embodiment of the present disclosure.

In addition, as shown in FIG. 3, FIG. 3 is a third schematic structural diagram of a display panel according to an embodiment of the present disclosure. The light-emitting side of the first dimming layer 120 of the display panel 100 shown in FIG. 1 is disposed close to the light incident side of the display panel main body 110. It can be understood that a hierarchical structure of the display panel 100 may be such that the light incident side of the first dimming layer 120 is disposed close to the light-emitting side of the display panel main body 110.

For example, the display panel 100 may be applied to a display device that may include a backlight module. As shown in FIG. 1, the backlight module may be disposed on a side of the first dimming layer 120 away from the display panel body 110, i.e., the first dimming layer is disposed between the display panel body 110 and the backlight module. Alternatively, as shown in FIG. 2, the backlight module may be disposed on a side close to the display panel body 110 and away from the first dimming layer 120, i.e., the first dimming layer 120 is disposed on a side of the display panel body 110 away from the backlight module.

It should be noted that, when the first dimming layer 120 is disposed between the display panel body 110 and the backlight module, the first dimming layer 120 may be disposed separately as described above, or may be disposed inside the backlight module, and may be disposed on a side close to the display panel body 110, that is, the light emitted from the backlight module passes through the first dimming layer 120 and then the display panel body 110.

In this embodiment, the first dimming layer 120 is disposed on the light incident side of the display panel body 110, and the plurality of light receiving members 122 in the first dimming layer 120 are electrically energized so that the plurality of light receiving members 122 form a liquid crystal lens structure, and therefore the plurality of light receiving members play a light receiving role on light passing through the plurality of light receiving members 122, and the display effect of the display panel 100 at a specific viewing angle is improved, and the display panel 100 has a function of anti-peep. When the plurality of light receiving members 122 are not energized, the plurality of light receiving members 122 are placed in a non-lens structure, the transmittance of light is higher, and the intensity of light incident on the display panel body 110 can be increased. As can be seen from the above, the display panel 100 in this embodiment improves the display effect of the display panel 100 at a specific viewing angle by providing the first dimming layer 120, and enables the display panel 100 to have an anti-peep function. In addition, the display panel 100 is switched between an anti-peep display and a conventional display, thereby improving the applicability of the display panel 100.

Figure 4:
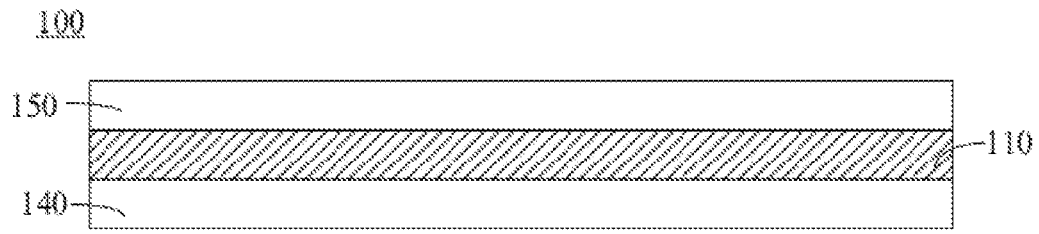
FIG. 4 is a fourth schematic structural diagram of a display panel according to an embodiment of the present disclosure.

Referring to FIG. 4, FIG. 4 is a fourth schematic structural diagram of a display panel according to an embodiment of the present disclosure. The display panel 100 may further comprise a first polarizer 140 disposed on one side of the display panel body 100 and a second polarizer 150 disposed on a side of the display panel body 100 away from the first polarizer 140, and a direction of a light transmission axis of the first polarizer 140 is perpendicular to a direction of a light transmission axis of the second polarizer 150.

Figure 5:
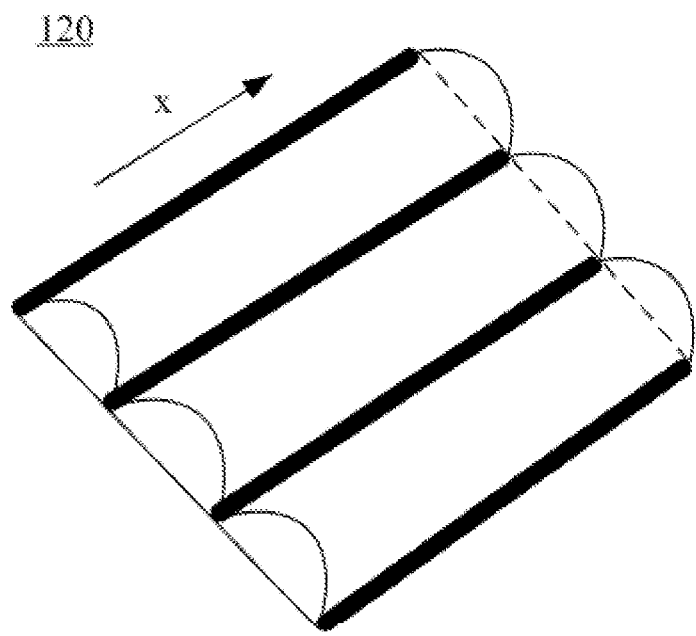
FIG. 5 is a schematic structural diagram of a first dimming layer according to an embodiment of the present disclosure.

Referring to FIG. 5, FIG. 5 is a schematic structural diagram of a first dimming layer according to an embodiment of the present disclosure. Each light receiving member 122 in the first dimming layer 120 may be a stripe structure, which may be a long axis direction, that is, each light receiving member 122 has a first extension direction x toward the long axis direction.

When the first dimming layer 120 is disposed on a side of the first polarizer 140 away from the second polarizer 150, the first extension direction x may be parallel to the direction of the light transmission axis of the first polarizer 140 so that the light effect passing through the first dimming layer 120 is enhanced. When the first dimming layer 120 is disposed on a side of the second polarizer 150 away from the first polarizer 140, the first extension direction x may be parallel to the direction of the light transmission axis of the second polarizer 150 so that the light effect passing through the first dimming layer 120 is enhanced.

Figure 6:
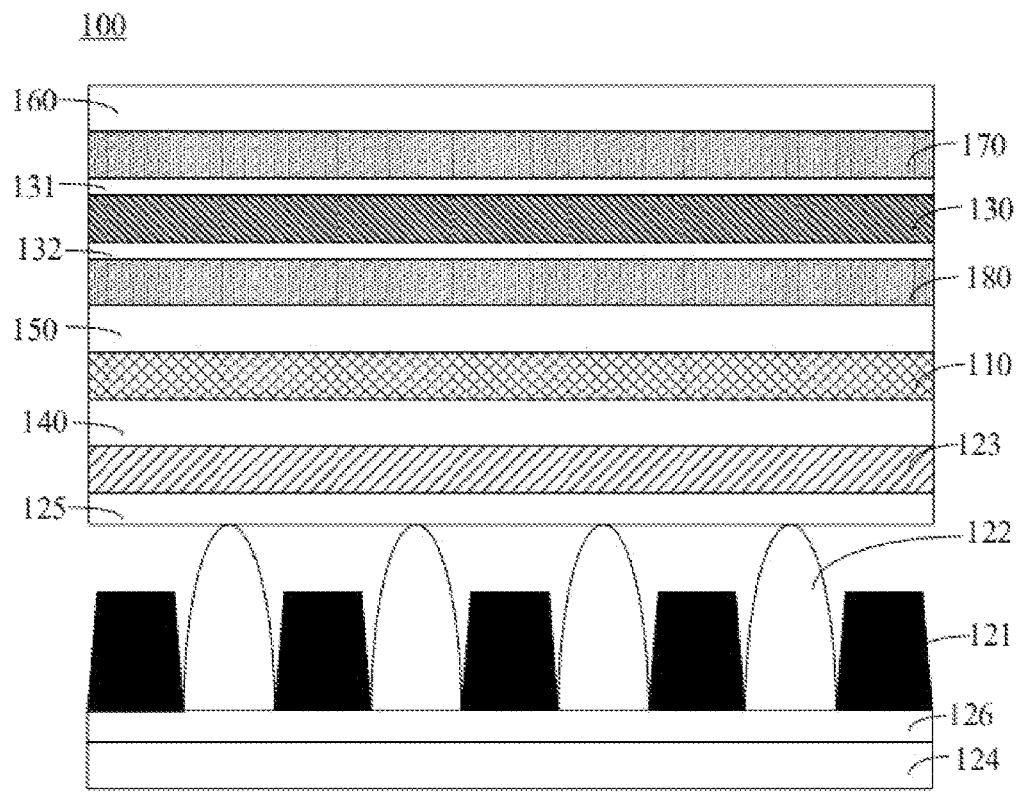
FIG. 6 is a fifth schematic structural diagram of a display panel according to an embodiment of the present disclosure.

In order to further improve the display effect of the display panel 100 in the anti-peep display and the conventional display, please refer to FIG. 6. FIG. 6 is a fifth schematic structural diagram of a display panel according to an embodiment of the present disclosure. The display panel 100 may further comprise a second dimming layer 130, which may be disposed on a side of the display panel body 110 away from the first dimming layer 120. The second dimming layer 130 may also be disposed on a side of the display panel body 110 at the same time as the first dimming layer 120. In this case, the first dimming layer 120 may be disposed between the second dimming layer 130 and the display panel body 110.

The second dimming layer 130 includes a polymer network and liquid crystal molecules distributed in the polymer network, wherein the polymer network is arranged in the first direction for directing the liquid crystal molecules distributed in the polymer network in the first direction.

The display panel 100 further comprises a third polarizer 160, and the second dimming layer 130 may be disposed between the third polarizer 160 and the first polarizer 140 or between the third polarizer 160 and the second polarizer 150. When the second dimming layer 130 is disposed between the third polarizer 160 and the first polarizer 140, the direction of the light transmission axis of the first polarizer 140 is parallel to a direction of a light transmission axis of the third polarizer 160, and the direction of the light transmission axis of the second polarizer 150 is perpendicular to the direction of the light transmission axis of the first polarizer 140 or the third polarizer 160. The display panel body 110 is positioned between the first polarizer 140 and the second polarizer 150 to implement a normal display function of the display panel body 110, and the second dimming layer 130 is disposed between the first polarizer 140 and the third polarizer 160 to implement the anti-peep function of the display panel 100. When the second dimming layer 130 is disposed between the third polarizer 160 and the second polarizer 150, the direction of the light transmission axis of the second polarizer 150 is parallel to the direction of the light transmission axis of the third polarizer 160, and the direction of the light transmission axis of the first polarizer 140 is perpendicular to the direction of the light transmission axis of the second polarizer 150 or the third polarizer 160. The display panel body 110 is positioned between the first polarizer 140 and the second polarizer 150 to implement a normal display function of the display panel body 110, and the second dimming layer 130 is disposed between the second polarizer 150 and the third polarizer 160 to implement the anti-peep function of the display panel 100.

Please continue to refer to FIG. 6. In a third mode, the long axis of the liquid crystal molecules is arranged in the first direction, and the first direction has an acute angle with respect to the normal direction of the second polarizer 150. In a fourth mode, the long axis of the liquid crystal molecules is arranged in the second direction, the second direction is different from the first direction, and a viewing angle of the display panel 100 in the third mode is less than a viewing angle of the display panel 100 in the fourth mode.

It should be noted that the third mode of the display panel may be an anti-peep mode, and the fourth mode may be a conventional display mode. In addition, the second dimming layer 130 is for causing first light incident in the normal direction of the second polarizer 150 to pass through the third polarizer 160 in the third mode, and causing second light incident in the normal direction of the second polarizer 150 to be blocked or partially blocked by the second polarizer 150. In the fourth mode, however, the long axis of the liquid crystal molecules is different from the first direction, so that more light can pass through the third polarizer 160 to increase the viewing angle range of the display panel 100 in the fourth mode and achieve an effect that the viewing angle of the display panel 100 in the fourth mode is greater than the viewing angle of the display panel 100 in the third mode.

In the implementation of application, the polymer network in the second dimming layer 130 is arranged in a direction inclined to the normal direction of the second polarizer 150, that is, the angle between the first direction and the normal direction of the second polarizer 150 is acute, thereby providing an orientation for the liquid crystal molecules so that the long axis of the liquid crystal molecules is also acute with the normal direction of the second polarizer 150. The liquid crystal molecules themselves have deflection characteristics for light, so that the first light passes through the third polarizer 160 and the second light is blocked or partially blocked by the third polarizer 160. As a result, the display panel 100 can selectively transmit light of different viewing angles, thereby playing an anti-peep role of a specific viewing angle, and further improving applicability of the display panel.

Specifically, a third electrode layer 170 is disposed between the second polarizer 150 and the second dimming layer 130, and a fourth electrode layer 180 is disposed between the third polarizer 160 and the second dimming layer 130, wherein the third electrode layer 170 and the fourth electrode layer 180 are configured to load a voltage to control the long axis of the liquid crystal molecules to switch between the first direction and the second direction, thereby causing the display panel 100 to switch between the anti-peep display and the conventional display.

A first alignment layer 131 and a second alignment layer 132 are disposed on both sides of the second dimming layer 130. Specifically, the first alignment layer 131 is disposed between the third electrode layer 170 and the second dimming layer 130, and the second alignment layer 132 is disposed between the fourth electrode layer 180 and the second dimming layer 130. A pre-tilt direction of the first alignment layer 131 and a pre-tilt direction of the second alignment layer 132 are parallel to the first direction. The pre-tilt angles formed during alignment of the first alignment layer 131 and the second alignment layer 132 are parallel to the first direction, and a polymer network arranged in the first direction is obtained in the process.

It should be noted that when the display panel 100 is in the third mode, an orthographic projection of the long axis of the liquid crystal molecules on the second polarizer 150 is parallel to the light transmission axis of the second polarizer 150. Specifically, after the first light and the second light pass through the first polarizer 140 and the display panel body 110, a polarization direction of the first light and a polarization direction of the second light are both parallel to the direction of the light transmission axis of the second polarizer 150.

Since the first light is incident along the normal direction of the second polarizer 150, the first light and the liquid crystal molecules are in a same plane in a three-dimensional space, and the polarization direction of the first light only passes through the long axis of the liquid crystal molecules, no phase difference occurs after the first light pass through the second dimming layer 130, that is, no deflection occurs, and the first light can pass through the third polarizer 160.

The second light is incident in a direction inclined to the normal direction of the second polarizer 150, and in the three-dimensional space, the polarization direction of the second light is at a certain angle with the long axis of the liquid crystal molecules. Therefore, the second light passes through the second dimming layer 130 and a phase difference occurs, that is, deflection occurs, and the polarization direction of the second light after deflection also changes, so that the second light cannot directly pass through the third polarizer 160. If the deflected light is perpendicular to the direction of the light transmission axis of the second polarizer 150, the light is completely blocked by the third polarizer 160. In this case, the user can only view the display panel from the front viewing angle direction, but has no display content for the other viewing angles of the display panel to further prevent peephole. If the polarization direction of the deflected light is at an acute angle to the transmission axis direction of the second polarizer 150, a decomposed portion along the transmission axis direction of the second polarizer 150 can pass through the third polarizer 160. In this case, the display panel is normally viewed by the user in the front viewing angle direction, and the display brightness of the display panel in the other viewing angle direction is darker, so as to prevent peephole.

Further, when power is applied between the third electrode layer 170 and the fourth electrode layer 180, deflection of the liquid crystal molecules may be controlled such that the long axis of the liquid crystal molecules is arranged in the second direction and the second direction is different from the first direction so that the display panel is in the fourth mode.

When the liquid crystal molecules are positive liquid crystals, the second direction is parallel to the normal direction of the second polarizer 150, and both the first light and the second light are not deflected when passing through the second dimming layer 130, and the display panel does not affect the light passing through the display panel body 110 and the second polarizer 150 in the fourth mode, thereby improving the display effect of the display panel in the fourth mode.

When the liquid crystal analysis is negative liquid crystals, the second direction is perpendicular to the normal direction of the second polarizer 150, and both the first light and the second light pass through the second dimming layer 130 without deflection, and the same display effect as the positive liquid crystal is achieved.

It should be noted that when the display panel 100 is in the fourth mode, since the arrangement direction of the liquid crystal molecules is different from the arrangement direction of the polymer network, the first light and the second light are scattered when passing through the second dimming layer 130, so that the viewing angle range of the emitted light is more uniform, and the display effect of the display panel 100 under the conventional display is further improved.

In addition, the display panel 100 may further comprise a phase compensation layer disposed between the second polarizer 150 and the second dimming layer 130, the phase compensation layer including a positive uniaxial C-type compensation film, a negative uniaxial C-type compensation film, or at least one A-type compensation film, and a wide viewing angle display effect of the display panel 100 in the conventional display, i.e., the fourth mode can be improved by adding the phase compensation layer.

It should be noted that on the basis of adding the first dimming layer 120 to the display panel 100 and adding the second dimming layer 130, the display effect of the display panel 100 in anti-peep display and conventional display can be enhanced. Specifically, the first dimming layer 120 may be energized so that the display panel 100 is in the anti-peep display, and the second dimming layer 130 is not energized so that the display effect of the anti-peep display is enhanced. The first dimming layer 120 is not powered so that the display panel 100 is in the conventional display mode, and the second dimming layer 130 is powered so that the display effect of the conventional display is enhanced.

In addition, a structure of the display panel 100 shown in FIG. 6 that the first dimming layer 120 and the second dimming layer 130 are respectively disposed on the light incident side and the light-emitting side of the display panel body 110, that is, the first dimming layer 120 is disposed on the side of the first polarizer 140 away from the second polarizer 150, and the second dimming layer 130 is disposed on the side of the second polarizer 150 away from the first polarizer 140. In this case, the first extension direction of the first dimming layer 120 is parallel to the direction of the light transmission axis of the first polarizer 140, and the direction of the light transmission axis of the third polarizer 160 is parallel to the direction of the light transmission axis of the second polarizer 150. If the plurality of light receiving members 122 do not have a strip-like structure and are arranged in an array, it is only necessary that the transmission axis direction of the entire third polarizer 160 is parallel to the transmission axis direction of the second polarizer 150.

Figure 7:
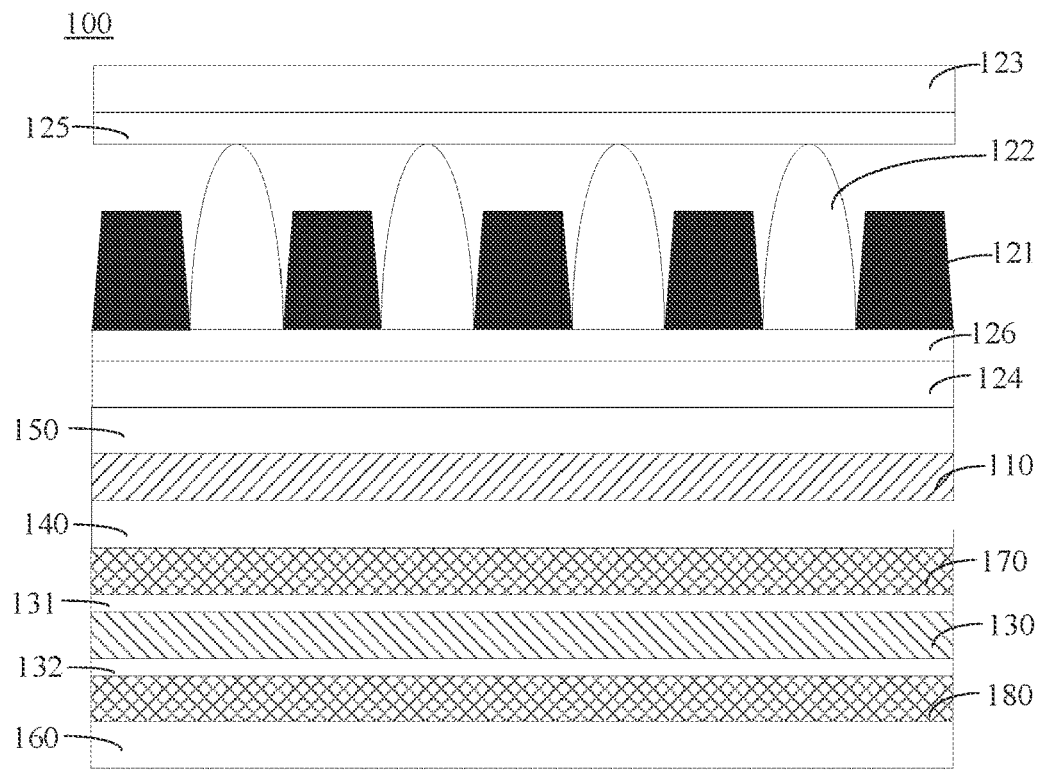
FIG. 7 is a sixth schematic structural diagram of a display panel according to an embodiment of the present disclosure.
Figure 8:
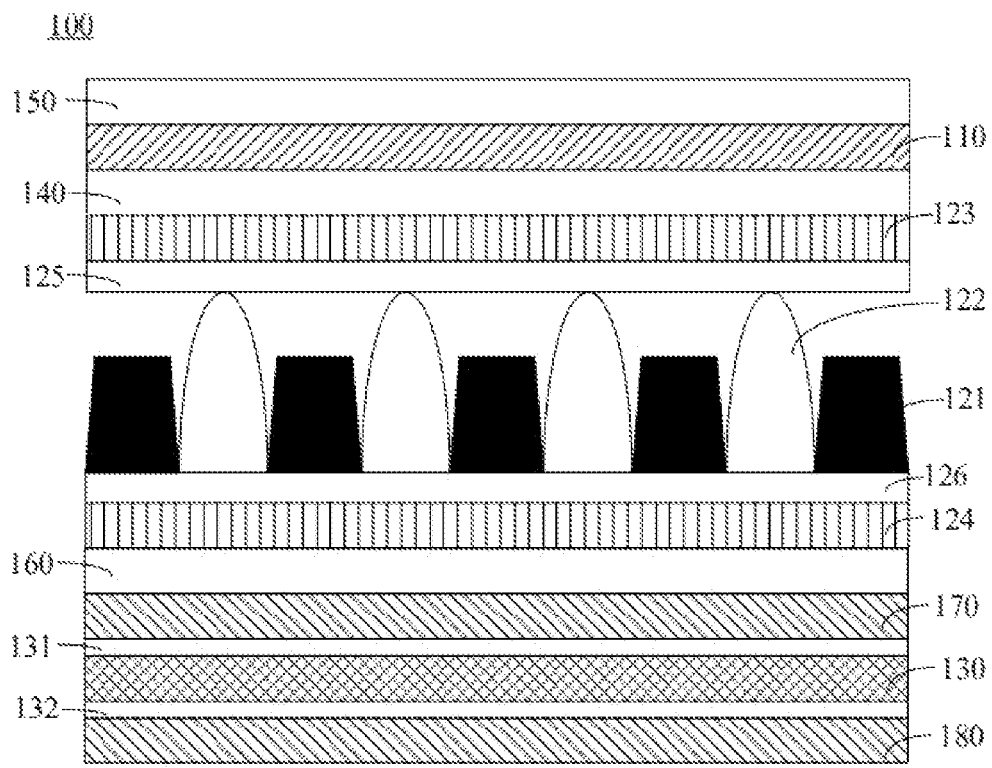
FIG. 8 is a seventh schematic structural diagram of a display panel according to an embodiment of the present disclosure.

Referring to FIG. 7, FIG. 7 is a sixth schematic structural diagram of a display panel according to an embodiment of the present disclosure. The display panel 100 has a hierarchical structure in which the first dimming layer 120 is disposed on the light-emitting side of the display panel body, and the second dimming layer 130 is disposed on the light incident side of the display panel body 110, that is, the first dimming layer 120 is disposed on the side of the second polarizer 150 away from the first polarizer 140, and the second dimming layer 130 is disposed on the side of the first polarizer 140 away from the second polarizer 150. In this case, the first extension direction of the first dimming layer 120 is parallel to the direction of the light transmission axis of the second polarizer 150, and the direction of the light transmission axis of the third polarizer 160 is parallel to the direction of the light transmission axis of the first polarizer 140.

Of course, the first dimming layer 120 and the second dimming layer 130 may be disposed on a same side of the display panel body 110. The first dimming layer 120 and the second dimming layer 130 are disposed on a same side of the first polarizer 140. In this case, the direction of the light transmission axis of the first polarizer 140 is parallel to the direction of the light transmission axis of the third polarizer 160, and the first extension direction of the first dimming layer 120 is parallel to the direction of the light transmission axis of the first polarizer 140 or the direction of the light transmission axis of the third polarizer 160.

Figure 9:
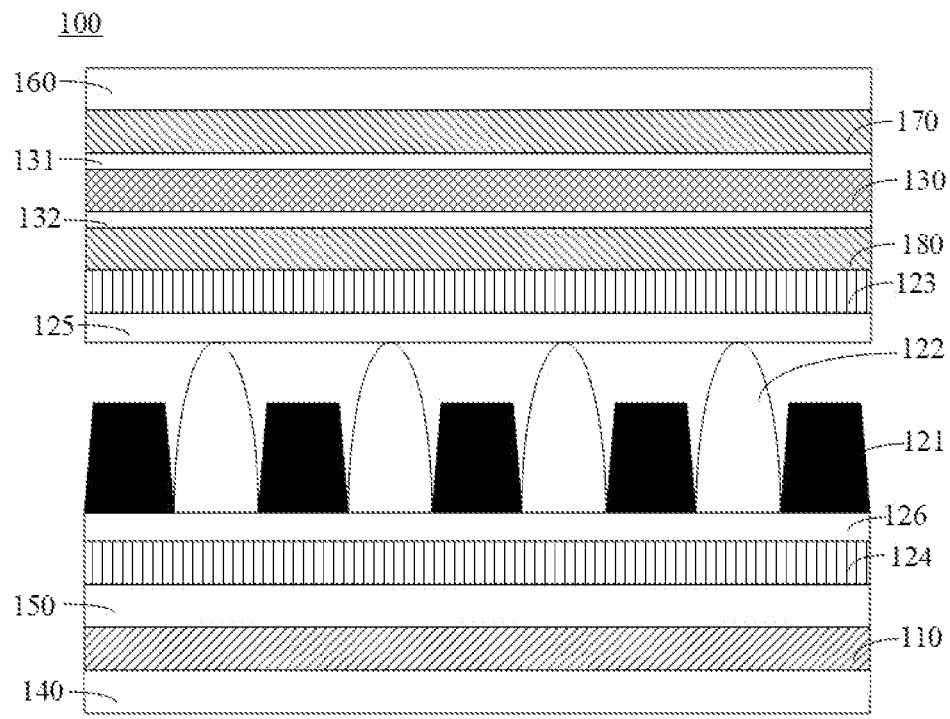
FIG. 9 is an eighth schematic structural diagram of a display panel according to an embodiment of the present disclosure.

Referring to FIG. 9, FIG. 9 is a eighth schematic structural diagram of a display panel according to an embodiment of the present disclosure. The first dimming layer 120 and the second dimming layer 130 are disposed on a same side of the second polarizer 150. In this case, the direction of the light transmission axis of the second polarizer 150 is parallel to the direction of the light transmission axis of the third polarizer 160, and the first extension direction of the first dimming layer 120 is parallel to the direction of the light transmission axis of the second polarizer 150 or the direction of the light transmission axis of the third polarizer 160.

Figure 10:
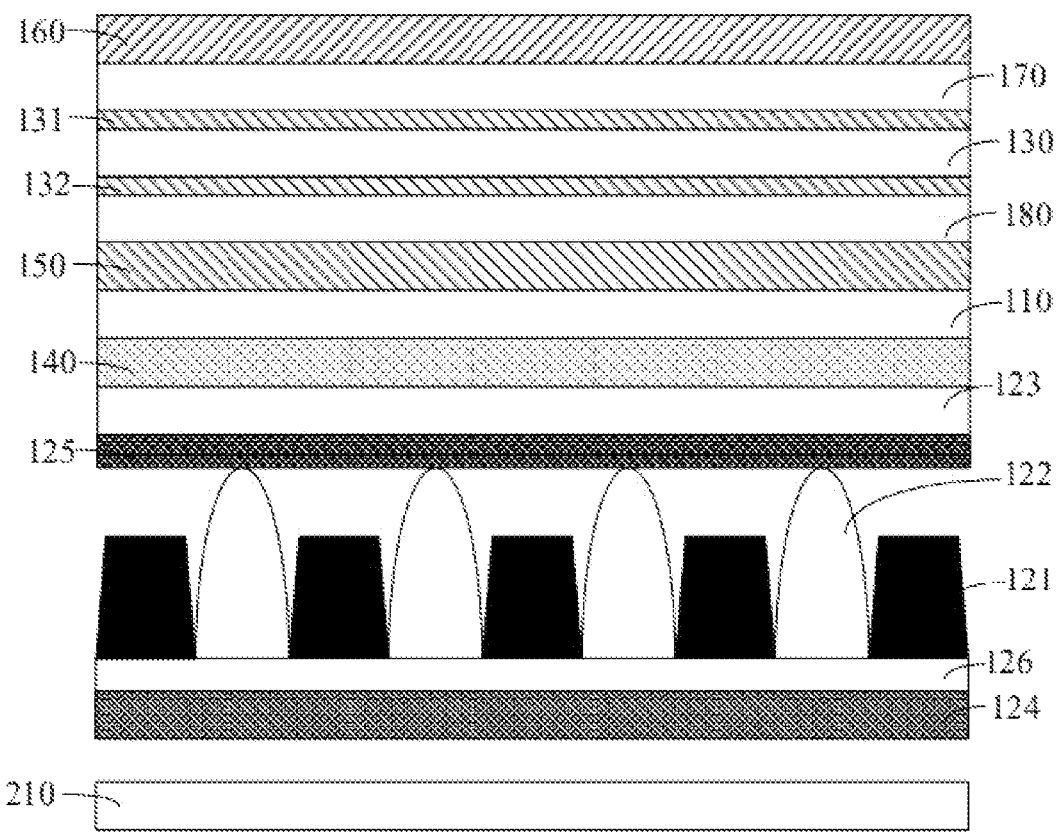
FIG. 10 is a schematic structural diagram of a display device according to an embodiment of the present disclosure.

An embodiment of the present disclosure further provides a display device. Referring to FIG. 10, FIG. 10 is a schematic structural diagram of a display device according to an embodiment of the present disclosure. The display device 200 may be a liquid crystal display device LCD or the like, and the display device 200 may comprise a display panel 100 and a backlight module 210.

The display panel 100 may comprise a display panel body 110 and a first dimming layer 120. For specific features of the display panel 100, refer to the embodiment described above.

The backlight module 210 may be disposed on a side of the first dimming layer 120 away from the display panel body 110, or may be disposed on a side of the display panel body 110 away from the first dimming layer 120 for emitting light to the first dimming layer 120 and the display panel body 110.

The backlight module 210 may provide a backlight for the display panel 100, and the backlight module 210 may include a collimated backlight so that in the display device 200, when the first dimming layer 120 in the display panel 100 forms a liquid crystal lens structure, a light receiving effect of collimating light is enhanced, which has a better collimation effect and a higher transmittance relative to a collimated film in the prior art, and solves a problem of increasing power consumption due to insufficient transmittance of the existing collimated film.

In addition, when the collimated backlight passes through the display panel body 110 to the second dimming layer 130, if the display panel is in the first mode, the amount of light incident in the normal direction of the second polarizer 150 can be increased, and the display brightness at the front viewing angle in the third mode can be increased to improve the display effect in the third mode. When the display panel is in the fourth mode, because the arrangement direction of the liquid crystal molecules is different from the inclination direction of the polymer network, the light passing through the second dimming layer 130 is scattered, so that the light of the collimated backlight diffuses, thereby improving the wide viewing angle visibility in the fourth mode, so that the display device still has a good wide viewing angle display effect in the fourth mode.

It should be noted that the backlight module 210 is not limited to a collimated backlight, but may be other conventional backlight, such as a side-in backlight, which is not specifically limited herein.

In the above-described embodiments, the descriptions of the various embodiments are each focused, and portions of some embodiments that are not detailed may be referred to the related descriptions of other embodiments.

The display panel and display device provided in the embodiments of the present disclosure are described in detail above. The principles and embodiments of the present disclosure are described by using specific examples herein. The description of the embodiments is merely intended to help understand the method and core ideas of the present disclosure. At the same time, a person skilled in the art may have changes in the specific embodiments and application scope according to the idea of the present disclosure. In summary, the content of the specification should not be construed as a limitation to the present disclosure.

What is claimed is:

1. A display panel, comprising:
a display panel body; and
a first dimming layer disposed on one side of the display panel body, wherein the first dimming layer comprises a plurality of light shielding members and a plurality of light receiving members, the plurality of light shielding members are disposed at intervals, each of the light receiving members is disposed between two adjacent light shielding members;
wherein the plurality of light receiving members is a lens structure in a first mode,
wherein the display panel comprises a first polarizer disposed on a side of the display panel body, a second polarizer disposed on a side of the display panel body away from the first polarizer, a direction of a light transmission axis of the first polarizer is perpendicular to a direction of a light transmission axis of the second polarizer, and each of the light receiving members in the first dimming layer has a first extension direction;
wherein the first dimming layer is disposed on a side of the first polarizer away from the second polarizer, and the first extension direction is parallel to the direction of the light transmission axis of the first polarizer; or
the first dimming layer is disposed on a side of the second polarizer away from the first polarizer, and the first extension direction is parallel to the direction of the light transmission axis of the second polarizer,
wherein the display panel further comprises a second dimming layer and a third polarizer, the second dimming layer is disposed between the third polarizer and the first polarizer or between the third polarizer and the second polarizer.

2. The display panel according to claim 1, wherein the plurality of light receiving members comprise a light incident side and a light-emitting side, and wherein the lens structure protrudes toward the light-emitting side.

3. The display panel according to claim 1, wherein the plurality of light receiving members are a non-lens structure in a second mode, and wherein a viewing angle of the display panel in the first mode is less than a viewing angle of the display panel in the second mode.

4. The display panel according to claim 3, wherein the first dimming layer further comprises a first substrate disposed between the display panel body and the plurality of light receiving members, and a second substrate disposed on a side of the plurality of light receiving members away from the display panel body, and the first substrate and the second substrate are configured to protect the plurality of light shielding members and the plurality of light receiving members.

5. The display panel according to claim 4, wherein a first electrode layer is disposed between the first substrate and the plurality of light receiving members, and a second electrode layer is disposed between the second substrate and the plurality of light receiving members, wherein the first electrode layer and the second electrode layer are configured to load a voltage to control the plurality of light receiving members to switch between the first mode and the second mode.

6. The display panel according to claim 5, wherein the plurality of light receiving members comprise a liquid crystal material;
the plurality of light receiving members form the lens structure when a voltage is applied between the first electrode layer and the second electrode layer; and
the plurality of light receiving members are the non-lens structure when no voltage is applied between the first electrode layer and the second electrode layer.

7. The display panel according to claim 6, wherein a material of the plurality of light shielding members comprises an electrochromic material;
when the plurality of light receiving members are the lens structure, the plurality of light shielding members are a first color;
when the plurality of light receiving members are the non-lens structure, the plurality of light shielding members are a second color.

8. The display panel according to claim 1, wherein a material of the plurality of light shielding members comprises a black photoresist or a ferrous metal material.

9. The display panel according to claim 8, wherein the plurality of light receiving members are the lens structure made of a polymer material or a photoresist material.

10. The display panel according to claim 1, wherein a height of each of the light receiving members is greater than a height of each of the light shielding members.

11. The display panel according to claim 1, wherein the display panel is applied to a display device comprising a backlight module, and the first dimming layer is disposed on a side of the display panel body away from the backlight module or between the display panel body and the backlight module.

12. The display panel according to claim 1, wherein the display panel is applied to a display device comprising a backlight module, and the first dimming layer is disposed inside the backlight module and on a side close to the display panel body.

13. The display panel according to claim 1, wherein when the first dimming layer and the second dimming layer are disposed on a same side of the first polarizer, the direction of the light transmission axis of the first polarizer is parallel to a direction of a light transmission axis of the third polarizer, and the first extension direction of the first dimming layer is parallel to the direction of the light transmission axis of the first polarizer or the direction of the light transmission axis of the third polarizer.

14. The display panel according to claim 1, wherein when the first dimming layer and the second dimming layer are disposed on a same side of the second polarizer, the direction of the light transmission axis of the second polarizer is parallel to a direction of a light transmission axis of the third polarizer, and the first extension direction of the first dimming layer is parallel to the direction of the light transmission axis of the second polarizer or the direction of the light transmission axis of the third polarizer.

15. The display panel according to claim 1, wherein the first dimming layer is disposed on a side of the first polarizer away from the second polarizer, and the second dimming layer is disposed on a side of the second polarizer away from the first polarizer, the first extension direction of the first dimming layer is parallel to the direction of the light transmission axis of the first polarizer, and a direction of a light transmission axis of the third polarizer is parallel to the direction of the light transmission axis of the second polarizer.

16. The display panel according to claim 1, wherein the first dimming layer is disposed on a side of the second polarizer away from the first polarizer, and the second dimming layer is disposed on a side of the first polarizer away from the second polarizer, the first extension direction of the first dimming layer is parallel to the direction of the light transmission axis of the second polarizer, and a direction of a light transmission axis of the third polarizer is parallel to the direction of the light transmission axis of the first polarizer.

17. A display device, comprising:
a display panel comprising the display panel according to claim 1;
a backlight module disposed on one side of the display panel for emitting light to the display panel.

18. The display device according to claim 17, wherein the backlight module comprises a collimated backlight.

* * * * *